United States Patent [19]

Kostello et al.

[11] 4,277,985
[45] Jul. 14, 1981

[54] CARBON SPACER

[75] Inventors: Edward M. Kostello, Troy, Mich.; Kenneth L. Schulte, Jr., Plain City, Ohio

[73] Assignee: Rockwell International Corporation, Pittsburgh, Pa.

[21] Appl. No.: 79,407

[22] Filed: Sep. 27, 1979

[51] Int. Cl.³ .............................................. F16H 1/40
[52] U.S. Cl. ........................................ 74/713; 74/526
[58] Field of Search ................. 74/526, 574, 713, 710, 74/710.5, 711, 714, 715

[56] References Cited

U.S. PATENT DOCUMENTS 2,651,216  9/1953  Alden .................................... 74/713
3,208,301  9/1965  Chaivre et al. ......................... 74/526

Primary Examiner—Leslie Braun
Assistant Examiner—Mark A. Daugherty

[57] ABSTRACT

A spacer is used to set the running clearance between parts in a power transmitting device. The power transmitting device contains a housing, a shaft rotatably mounted in the housing and a ring gear mounted on the shaft for rotation therewith. The ring gear is capable of deflecting in an axial direction under load. A stop member, fixed to the housing, is positioned to have one end adjacent one side of the ring gear. The stop member is installed to be in abutting contact with the ring gear. The spacer is formed of a material capable of wearing away when contacted by the rotating ring gear to produce a gap of a predetermined thickness between one end of the stop member and the ring gear. The one end of the stop member will prevent the ring gear from deflecting axially under load a distance greater than the predetermined distance.

8 Claims, 2 Drawing Figures

CARBON SPACER

BACKGROUND OF THE INVENTION

1. Field of the Invention

This invention relates to a spacer which is used to set a distance between an adjustable stop member and a rotating gear in a power transmitting device. In particular, this invention relates to the use of a spacer which, when worn away, produces a running clearance between two parts in the power transmission device and the residue is non-deleterious to moving parts in a power transmitting device.

2. Description of the Prior Art

It has been well known in the automotive power transmission art that large diameter gears in power transmitting devices, such as differentials, deflect axially under load conditions. Typically, thrust screws or other stop members are used to limit the axial deflection of these large gears. Such a thrust screw is shown in U.S. Pat. No. 2,651,216 to H. W. Alden issued Sept. 8, 1953.

Normally, the thrust screw is axially spaced from the side of the large gear or ring gear to limit axial deflection when the differential is loaded. In order to keep stresses within acceptable levels, the distance between the thrust screw and the ring gear must be controlled accurately to insure that deflections are kept within allowable limits. In the past, the difference between the thrust screw and the ring gear has been set using feeler gauges or shim stock with a thickness of 0.010 to 0.020 inches. This has been found to be a very time consuming process and has caused problems in assembly line production.

The spacer of the present invention is bonded to the bottom of the thrust screw and abuts the ring gear. The spacer is made of a wearable material which is of a thickness equal to the 0.010 to 0.020 required running clearance. As the ring gear rotates, the spacer is worn away thus producing the required running clearance. The spacer, which is made of a material such as carbon, disintragates producing residue that is non deleterious to bearings or gearing.

SUMMARY OF THE INVENTION

It is an object of this invention to provide a way of setting the running clearance between a thrust screw and a rotating gear in an automotive powered transmission device.

It is a further object of this invention to provide a spacer made of thin material which is capable of being worn away while in contact with the rotating gear to provide the required running clearance between the rotating gear and a stop member.

It is yet a further object of this invention to provide a spacer made of carbon sheet which is bonded to a thrust screw and is worn away during contact with a rotating gear.

It is yet an additional object of this invention to provide a spacer which, upon being worn away, leaves a residue which does not cause any detrimental effect to rotating to rotating parts within the power transmitting device.

It is yet an additional object of this invention to provide a method of assembling a power transmission device which includes the setting of a running clearance between a stop member and a rotating gear which eliminates time consuming hand adjustment of parts thus providing a more economical power transmission.

These and other objects of the invention are disclosed in the preferred embodiment of the invention which includes a power transmitting device comprising a housing, a shaft rotatably mounted in the housing and a ring gear mounted on the shaft for rotation therewith. The ring gear is capable of deflecting in an axial direction under load. A stop member is fixed to the housing and has one end adjacent one side of the ring gear. The stop member limits axial deflection of the ring gear to prevent overstressing of the components. A spacer of a predetermined thickness is attached to the end of the stop member adjacent the ring gear and is in abutting contact with the ring gear. The spacer is formed of a material capable of wearing when contacted by the rotating ring gear and thereby provides a running clearance of the predetermined thickness between one end of the stop member and the ring gear. Consequently, the one end of the stop member will prevent the ring gear from deflecting axially under load a distance greater than the predetermined distance. The spacer is made of a material which is non deleterious to moving parts after being worn away.

These and other objects and advantages of the invention will become apparent from the following description of the accompanying drawing.

DESCRIPTION OF THE INVENTION

Figure 2:
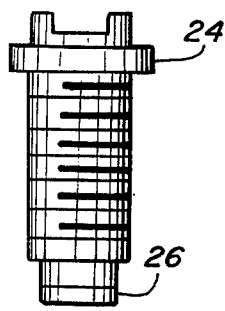
FIG. 2 is an enlarged view of the thrust screw shown in FIG. 1.
Figure 1:
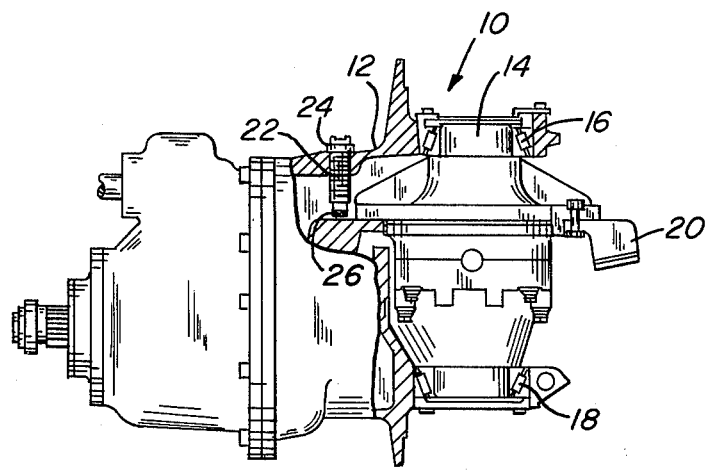
FIG. 1 is a cross sectional view of a power transmitting device including the present invention.

With reference to FIGS. 1 and 2 there is shown a power transmitting device denoted as 10. The device 10 includes a housing 12, a shaft 14 mounted on bearings 16 and 18 which are located in housing 12. A ring gear 20 is mounted on the shaft 14 for rotation therewith. A stop member 22 is fixed in the housing 12 and extends into the device to have one end adjacent one side of the ring gear 20.

In the preferred embodiment, the power transmitting device is an automotive differential. The preferred stop member 22 used in the automotive differential is a thrust screw which is locked in position in the housing by jam nut 24. The thrust screw limits the axial deflection of the ring gear 20 under load conditions during normal operation of the differential.

The gap or running clearance between the ring gear 20 and the stop member 22 which determines the amount of axial deflection allowed under load conditions is critical in that a gap too large would allow the build up of stresses in the ring gear and shaft. Prior to the present invention, feeler gauges or shim stock has been used to set the critical distance between the thrust screw and the ring gear.

In the preferred embodiment, the desired running clearance is between 0.010 and 0.020 inches. The use of feeler gauges and shim stock to set this small gap is extremely time consuming and, consequently, makes the power transmitting device more expensive to mass produce.

In addition, it has been found that due to the spacial relationships of the parts inside the differential that setting this distance by hand is sometimes inaccurate and may reduce the life expectancy of certain parts in the differential.

Consequently, the present invention includes the spacer 26 bonded to the end of the stop member 22 which is adjacent the ring gear 20. The spacer has a diameter which is equal to or less than the diameter of the stop member. The spacer 26 is made of a material which is easily worn away when in rubbing contact with moving metal parts.

In the preferred embodiment, the spacer is made of a carbon material which is the same thickness as the desired running clearance between the ring gear 20 and the stop member 22. It has been found that a graphite sheet, such as GRAFOIL, a registered trademark of Union Carbide Corporation, which has a thickness equal to the desired gap is an ideal material for fulfilling the functional requirements set forth above for spacer 26. In the preferred embodiment, the carbon spacer is bonded to the stop member or thrust screw 22 by an adhesive such as ethyl cyanoacrylate which is sold under the trade name of LOCTITE Super Bonder 495, a trademark of the Loctite Corporation.

Upon assembly of the power transmitting device, the stop member 22, including the spacer 26 bonded thereto, is assembled so that the spacer is in abutting contact with the ring gear 20. As the ring gear rotates, it deflects due to the range of normal load conditions and, consequently, the spacer 26 is quickly and totally worn away thereby producing the desired running clearance between the stop member 22 and the ring gear 20.

Since the spacer 26 is worn away, it is imperative that its residue be non deleterious to the moving parts within the power transmitting device. It has been found that a graphite material not only is non deleterious to the moving parts but, in fact, may enhance lubrication between these parts after the spacer 26 is worn away.

The spacer of the present invention could be used to accurately space any two parts where the running clearance between them is critical. Setting the running clearance in this manner is far more economical than using feeler gauges or shim stock especially in mass produced items.

The invention described provides an improved method for setting the running clearance between a stop member and the ring gear in an automobile differential which enables a more economical way of manufacturing the same.

We claim:

1. A power transmitting device comprising: a housing; a shaft rotatably mounted in said housing; a ring gear mounted on said shaft for rotation therewith, said ring gear being capable of deflecting in an axial direction under load; a stop member fixed to said housing and having one end adjacent one side of said ring gear, said stop member limiting axial deflection of said ring gear; a spacer of a predetermined thickness attached to the end of said stop member adjacent said ring gear and abutting said ring gear; said spacer being formed of a material capable of wearing away when contacted by said rotating ring gear to provide a gap of said predetermined thickness between said one end of said stop member and said ring gear whereby said one end of said stop member will prevent said ring gear from deflecting axially under load a distance greater than said predetermined distance.

2. A power transmitting device as set forth in claim 1, wherein said spacer is made of a material whose residue is non deleterious to moving parts after being worn away.

3. A power transmitting device as set forth in claim 2, wherein said spacer is made of a material which enhances the lubrication between moving parts after being worn away.

4. A power transmitting device as set forth in claim 3, wherein said spacer is made of carbon material.

5. A power transmitting device as set forth in claim 1, wherein said spacer is attached to said thrust member by bonding with an adhesive.

6. A power transmitting device as set forth in claim 1, wherein said stop member is a screw capable of adjustment in a direction parallel to said axis toward and away from said ring gear and including means for locking said stop member in place.

7. A power transmitting device comprising: a housing; a shaft capable of rotation having a first and a second end and a longitudinal axis therethrough; a ring gear mounted in said housing to accommodate said first and said second end of said shaft; a stop member extending through said housing in a direction parallel to said axis of said shaft to a position adjacent one side of said ring gear to limit axial deflection of said ring gear; means for locking said stop member in place; a graphite spacer of a predetermined thickness bonded to an end of said stop member adjacent said ring gear; said spacer capable of wearing away when placed in contact with said rotating ring gear during axial deflection thereof to produce a gap of said predetermined thickness whereby said ring gear is prevented from axially deflecting from said normal position a distance greater than said predetermined distance after said spacer has worn away; and said spacer made of a material which enhances lubrication between moving parts after being worn away.

8. A method of setting the normal running clearance between a stop member installed in a housing of a power transmitting device and a rotating member fixed to a shaft rotatably mounted in said housing, said ring gear capable of deflecting axially from a normal operating position under high load operating conditions, the method comprising the steps of: forming a wearable spacer of predetermined thickness and a similar cross section to said stop member; bonding said spacer to an end of said stop member; installing said stop member in said housing with said spacer abutting said rotating member; locking said stop member in place; and wearing said spacer away during rotation of said ring gear to promote the desired running clearance equivalent to said predetermined thickness of said spacer.

* * * * *